US008937685B1

(12) United States Patent
Ho et al.

(10) Patent No.: US 8,937,685 B1
(45) Date of Patent: Jan. 20, 2015

(54) METHOD AND SYSTEM FOR OVERLAYING VIDEOS IN A TELEVISION SET USING A TELEVISION SCRIPT

(75) Inventors: Chi Fai Ho, Palo Alto, CA (US); Shin Cheung Simon Chiu, Palo Alto, CA (US); Bok Knun Randolph Chung, Los Altos, CA (US)

(73) Assignee: TP Lab, Inc., Palo Alto, CA (US)

( * ) Notice: Subject to any disclaimer, the term of this patent is extended or adjusted under 35 U.S.C. 154(b) by 1135 days.

(21) Appl. No.: 12/248,768

(22) Filed: Oct. 9, 2008

(51) Int. Cl.
  *H04N 5/45* (2011.01)
  *H04N 5/445* (2011.01)
  *H04N 5/93* (2006.01)
  *H04N 7/173* (2011.01)
  *G06F 3/00* (2006.01)

(52) U.S. Cl.
  USPC ........... 348/565; 348/564; 348/567; 348/568; 386/281; 715/700; 715/718; 715/719; 715/722; 715/723; 715/741; 715/742; 715/743; 715/131; 725/32; 725/37; 725/109; 725/110; 725/120

(58) Field of Classification Search
  USPC .......... 386/281; 348/E5.097, E5.104, E5.105, 348/E5.108, E5.112, 565, 564, 567, 568, 348/588, 581, 607, 910, E5.11, E7.012; 715/719, 718, 722, 723, 810, 741, 742, 715/743, 700; 725/37, 63, 68, 109, 110, 725/120, 131, 32; 709/229; 375/E7.025, 375/E7.268
  See application file for complete search history.

(56) References Cited

U.S. PATENT DOCUMENTS

| 5,847,771 A | * | 12/1998 | Cloutier et al. | ............... 348/564 |
| 6,380,985 B1 | * | 4/2002 | Callahan | ........................ 348/607 |
| 7,424,680 B2 | * | 9/2008 | Carpenter | ..................... 715/741 |
| 7,580,080 B2 | * | 8/2009 | Anderson | ..................... 348/565 |
| 7,730,405 B2 | * | 6/2010 | Gulli et al. | ..................... 715/719 |
| 2001/0049826 A1 | * | 12/2001 | Wilf | .............................. 725/120 |
| 2002/0067376 A1 | * | 6/2002 | Martin et al. | ................. 345/810 |
| 2002/0069411 A1 | * | 6/2002 | Rainville et al. | ................ 725/37 |
| 2004/0075675 A1 | * | 4/2004 | Raivisto et al. | ............... 345/700 |
| 2010/0037271 A1 | * | 2/2010 | Crowe | ............................ 725/68 |

* cited by examiner

*Primary Examiner* — Thai Tran
*Assistant Examiner* — Syed Hasan
(74) *Attorney, Agent, or Firm* — North Shore Patents, P.C.; Michele Liu Baillie (57) ABSTRACT

Method and system for overlaying videos in a television include: receiving a plurality of video signals directly from a plurality of video sources by the television; receiving and processing a script by the television, the script includes instructions for placing a first picture from a first video signal of the plurality of video signals in a first position at a first depth value on a display coupled to the television, and instructions for placing a second picture from a second video signal of the plurality of video signals in a second position at a second depth value on the display; and simultaneously displaying the first picture and the second picture on the display by the television in an overlayed manner, the first picture being displayed at the first position and at the first depth value, the second picture being displayed at the second position and at the second depth value.

38 Claims, 4 Drawing Sheets

METHOD AND SYSTEM FOR OVERLAYING VIDEOS IN A TELEVISION SET USING A TELEVISION SCRIPT

BACKGROUND OF THE INVENTION

1. Field

This invention relates generally to media, particularly to a system and method to overlay videos from multiple sources in a television set.

2. Related Arts

Television is often considered as a broadcast media, where the video content is controlled by television broadcasters. Broadcasters decide on what to show to consumers or viewers, and broadcasters dictate what consumers can see. Sometimes, when a broadcaster determines that multiple contents can be shown, the broadcaster combines the content into a single video signal and broadcasts the signal to the viewers. A viewer cannot choose one content over another, or a different combination of content. Let alone different viewers may prefer different choices of the combinations.

In one embodiment, John is watching a NFL football game on ESPN channel. During half time, ESPN decides to show the half time show with an overlay of a commentator summarizing the first half, and live interviews of several coaches and football players from other NFL teams. John is interested only in the half time show, but he cannot turn off the overlay videos. Jack is watching the same game. Jack, however, is interested in the interviews while watching the half time show. Unfortunately ESPN shows more videos of the summary than the interviews, even though the remaining interview video footage is available on ESPN's website. Jack is not happy about that.

In one embodiment, Tina watches every morning CNBC to check the financial and business news. Though Tina is definitely interested in the news, she thinks she can listen to them without watching the television. However, she is keen on the stock tickers on the screen. She wants the tickers to be more visible with larger letters and numbers. She does not have a choice as CNBC chooses the small text size for the tickers.

In one embodiment, a broadcaster does not want its video content to be shown together with video content from another broadcaster, opposite to consumers' desire. In one embodiment, John prefers to hear commentators from NBC Sports on the football game shown in ESPN channel. John wants to have an overlay video picture of NBC Sports anchorman to talk about the game while John watches the game telecasted by ESPN. In another embodiment, Tina wants to have two overlay pictures, one from CNN showing world news, and one from a local television station going over local weather and news, while she watches CNBC every morning.

In another embodiment, John watches a telecast football game in a local sports bar. The sports bar wants to put advertisements on the television set about their beverage and food menu. The bar wants also to advertise the weekly Friday night happy hour appetizer specials. Ideally the advertisements are displayed as overlay animations on the television set in the sports bar, similar to many typical overlay advertisements run by ESPN. The sports bar is interested only to advertise on the television sets in the bar, and is not willing to pay big money to purchase an advertisement slot with ESPN, which will show the televisions to millions of viewers who do not live near the bar or are not interested in sports bar.

In yet another embodiment, Jack purchases his television set from a local retail store at a discounted price. The television set connects to Internet. The retail store wants to use the television set to run promotion videos from the store's web site. The promotion videos are most effective when Jack watches sport games. For example, the retail store wants to run announcement of local sport events such as little league baseball games, sales of skiing equipment, profiles of athletics of a local high school. When Jack is watching a sports television program, the store wants to know the sports program and plays the corresponding promotion videos overlaying on top of the sports program on the television set.

The above embodiments illustrate a need to provide a method and a system to overlay a plurality of videos in a television set.

BRIEF SUMMARY OF THE INVENTION

The invention provides a method and system for overlaying videos in a television using a television script. In a method aspect, the invention comprises: receiving a plurality of video signals directly from a plurality of video sources by the television; receiving and processing a first script by the television, the first script comprising instructions for placing a first picture from a first video signal of the plurality of video signals in a first position at a first depth value on a display coupled to the television, and instructions for placing a second picture from a second video signal of the plurality of video signals in a second position at a second depth value on the display; and simultaneously displaying the first picture and the second picture on the display by the television in an overlayed manner, the first picture being displayed at the first position and at the first depth value, the second picture being displayed at the second position and at the second depth value.

In one aspect, the first picture is displayed as at least partially covering the second picture. In another aspect, the first picture is displayed as overlaying translucently on top of the second picture, wherein the second picture is at least partially visible.

In another feature, the method further comprises: receiving and processing a second script by the television, the second script comprising further instructions for placing the first picture and the second picture on the display, wherein the second script comprises a different depth value for the first picture or the second picture; and simultaneously displaying the first picture and the second picture on the display by the television, wherein the overlay display of the first and second pictures are changed according to the different depth value.

In one aspect, the first video signal comprises a description, wherein the television performs a video search on the plurality of video signals based on the description, where a result of the video search comprises a second video signal.

In an apparatus aspect, the invention comprises: a plurality of interfaces for receiving a plurality of video signals directly from a plurality of video sources; a first video player for processing a first video signal of the plurality of video signals; a first video buffer for storing a first picture from the processed first video signal, the first video buffer being associated with a first depth value; a second video player for processing a second video signal of the plurality of video signals; a second video buffer for storing a second picture from the processed second video signal, the second video buffer being associated with a second depth value; a local storage for storing a script, the script comprising instructions for placing the first picture at a first position at the first depth value and instructions for placing the second picture at a second position at the second depth value; and an overlay processor for processing the first video buffer by rendering the first picture in the first video buffer at the first position at the first depth value onto a display coupled to the television, for processing the second video buffer by rendering the second picture in the second video buffer at the second position at the second depth value, the first and second pictures being displayed simultaneously in an overlayed manner.

DETAILED DESCRIPTION OF THE INVENTION

Figure 1:
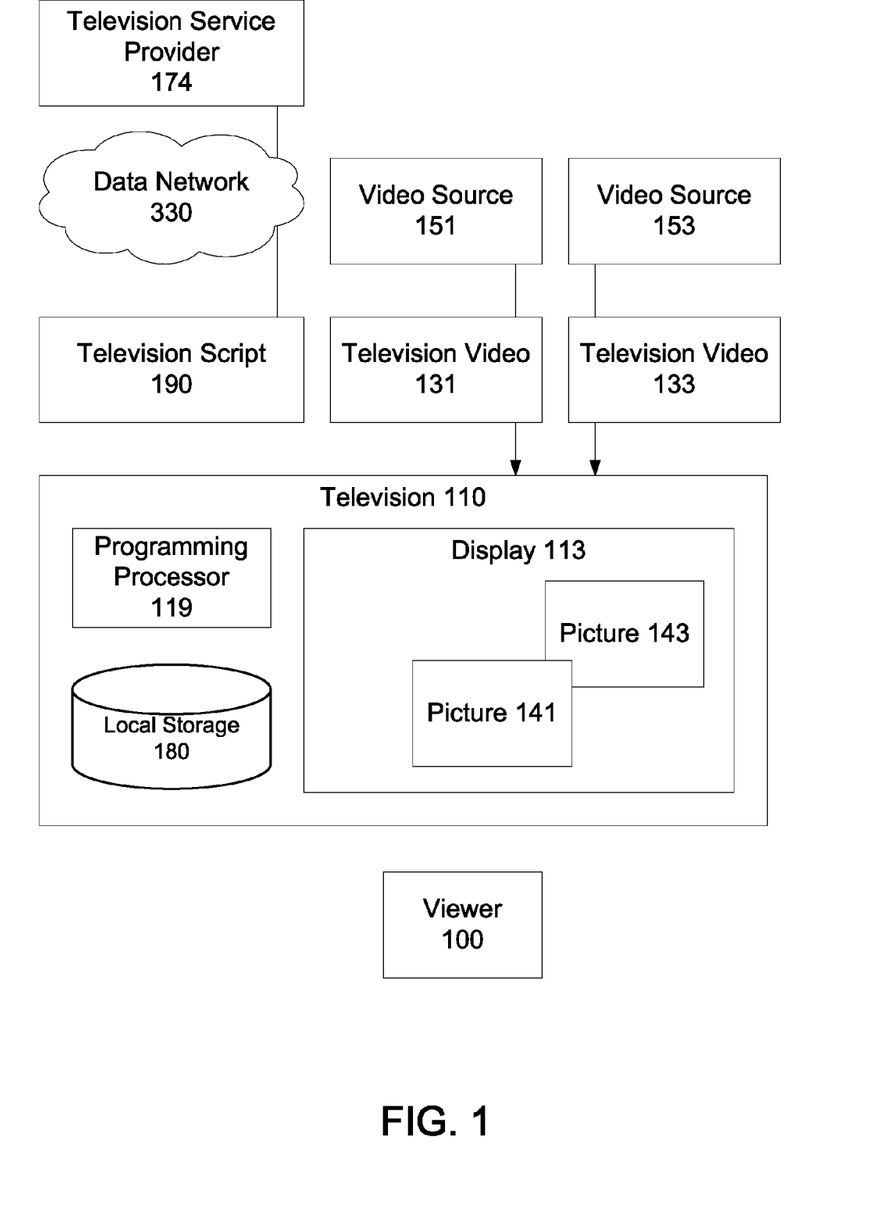
FIG. 1 illustrates a television set with overlaying videos.

FIG. 1 illustrates a television set with overlaying videos.
Viewer 100 is watching television 110. Television set or television 110 is a consumer electronic device, typically for watching broadcast television, cable or satellite television, or IP television. Television 110 receives a television video 131 from a video source 151.

In one embodiment, television 110 includes a High Definition Television (HDTV) set. In one embodiment, television 110 includes a digital media adaptor. In one embodiment, television 110 includes a Video Cassette Recorder (VCR), or a Digital Video Recorder (DVR). In one embodiment, television 110 includes a set-top-box. In one embodiment, the set-top-box includes a personal computer (PC), a notebook or a netbook. In one embodiment, television 110 includes a mobile entertainment device such as a smartphone, mobile internet device (MID) or a NetTop. In one embodiment, television 110 includes a PumpTop television. In one embodiment, television 110 includes a digital video signage, a kiosk, or a digital billboard. In one embodiment, television 110 includes a digital video scoreboard used in sports venue. In one embodiment, television 110 includes an all-in-one TV. In one embodiment, television 110 includes a touch sensitive screen. In one embodiment, television 110 is located in a living room, a family room, or a bedroom. In one embodiment, television 110 is located in a residential entertainment room.

In one embodiment, television 110 is placed on a low-profile table, or hung on a wall. In one embodiment, television 110 is located in a restaurant, a sports bar, or a shopping mall. In one embodiment, television 110 is located in an airport, a hotel lobby, a hotel guestroom, or a casino. In one embodiment, television 110 is located over a gas pump in a gas station. In one embodiment, television 110 is located in a retail store, in a bank, a supermarket or a department store. In one embodiment, television 110 is located in a reception area of a dental office, a clinic, a hospital, or a governmental office. In one embodiment, television 110 is located in a ball park, a stadium or a public place, such as a town-square, subway station, or a street corner. In one embodiment, television 110 is located in an elevator, a billboard, or a digital kiosk. In one embodiment, television 110 is located in a class room, a lecture hall, or a corporate conference room. In one embodiment, television 110 is located in an airplane, a passenger car, a bus or a train.

In one embodiment, television video 131 includes a stream of video and audio signals, such as Real Time Messaging Protocol (RTMP) signals, Moving Pictures Expert Group-1 (MPEG-2) signals, MPEG-4 signals, H.264, Windows Media Video (WMV), QuickTime video, On2 VP6-based signals, Digital Video Broadcasting Terrestrial (DVB-T), Digital Video Broadcasting Handhelds (DVB-H), or analog signals such as National Television System Committee (NTSC), or Phase Alternating Lind (PAL) signals. In one embodiment, television video 131 includes a Media RSS document or a Synchronized Multimedia Integration Language (SMIL) document. In one embodiment, television video 131 is a television show. In one embodiment, television video 131 is a movie. In one embodiment, television video 131 is a news broadcast. In one embodiment, television video 131 is a televised event, such as a National Football League (NFL) game, an Olympics track and field event, or Miss Universe Pageant. In one embodiment, television video 131 is a documentary, a web video, or a city council meeting broadcast. In one embodiment, television video 131 is an advertisement. In one embodiment, television video 131 is an animation, or a cartoon animation.

In one embodiment, video source 151 is a broadcast television network, such as a cable television network, a satellite television network, or terrestrial television network, also known as over-the-air (OTA) television network. In one embodiment, video source 151 is a broadband television network. In one embodiment, video source 151 is based on Internet Protocol Television (IPTV) technologies. In one embodiment, video source 151 is an Internet video portal or online video syndicate. In one embodiment, video source 151 is an on-line video rental service. In one embodiment, video source 151 is a web portal. In one embodiment, video source 151 is a home media center, a PC, a cable set-top box, a digital set-top box such as Sling, or Apple TV.

Television 110 includes interfaces for directly receiving video signals from a plurality of video sources. Television 110 connects to video source 151. In one embodiment, television 110 connects to video source 151 over a radio frequency (RF) interface, or a composite video input interface. In one embodiment, television 110 connects to video source 151 over a media component interface, such as an YCbCr interface. In one embodiment, television 110 connects to video source 151 over a High Definition Multimedia Interface (HDMI) or Digital Video Interface (DVI). In one embodiment, television 110 connects to video source 151 over a network interface, such as an Ethernet interface. In one embodiment, television 110 connects to video source 151 over a wireless network interface such as a Wireless Local Area Network (WLAN), a Worldwide Interoperability for Microware Access (WiMax) network, an Ultra-Wideband (UWB) network, or a 3G network interface. In one embodiment, television 110 connects to video source 151 over a cable modem interface or a Digital Subscriber Line (DSL) interface. In one embodiment, television 110 connects to video source 151 using Bluetooth, Data Over Cable Service Interface Specification (DOCSIS) 3.0, or Multimedia Over Coax Alliance (MoCA) technologies.

In one embodiment, television 110 includes a display 113. Display 113 includes a picture 141. Television 110 plays television video 131 onto picture 141. In one embodiment, display 113 includes a Cathode Ray Tube (CRT) screen, a Liquid Crystal Display (LCD) screen, or a plasma display panel. In one embodiment, display 113 includes a video projector or a video monitor. In one embodiment, display 113 has a screen size of 40 inches, 3.5 inches, 120 inches or 17 inches.

In one embodiment, television 110 connects to display 113. In one embodiment, television 110 connects to display 113 using an HDMI, a Digital Video Interface (DVI), a Universal Serial Bus (USB), IEEE 1394 (Firewire), a Video Graphics Array (VGA), or an S-video connector or cable. In one embodiment, television 110 connects to display 113 over a radio frequency (RF) interface. In one embodiment, television 110 connects to display 113 over a media component connector or cable, such as analog RCA or digital YCbCr connector or cable.

Television 110 processes a television script 190. Television 110 includes a programming processor 119 capable of processing television script 190. In one embodiment, programming processor 119 includes a micro-processor, such as Intel Pentium. Celeron, Atom, an AMD micro-processor, or a VIA micro-processor. In one embodiment, programming processor 119 includes an embedded micro-processor based on RISC architecture such as the MIPS, PowerPC, or ARM architecture. In one embodiment, programming processor 119 includes a multi-core processor, such as Intel's Core 2 Duo processor, or AMD's Opteron Quad-Core processor. Television 110 processes television script 190 using programming processor 119. Television script 190 includes one or more programming instructions to place picture 141 onto a position on display 113. In one embodiment, television script 190 is encoded in Extensible Markup Language (XML). In one embodiment, television script 190 is encoded in EMCAScript or Javascript. In one embodiment, television script 190 is encoded in Java. In one embodiment, television script 190 is encoded in a web scripting language, such as Hypertext Markup Language (HTML). In one embodiment, television script 190 is encoded in Visual Basic Script (VBScript). In one embodiment, television script 190 is encoded in the Common Language Infrastructure (CLI). In one example, television 110 processes television script 190 to place picture 141 with a size of 640×480 pixels from a top left position of (10, 10) to a bottom right position of (650, 490). In one example, television script 190 places picture 141 with a size of 0.5×0.3 from a top left corner of (0.1, 0.1) to a bottom right corner of (0.6, 0.4). In one embodiment, the placement is based on pixels, inches or centimeters. In one embodiment, television script 190 includes programming instructions to specify television video 131 is to be played onto picture 141. Television 110 processes television video 131 and picture 141 according to television script 190.

Similarly, television 110 processes a second television video 133 from video source 153. Television video 133 is played onto picture 143, which is included in display 113. In one embodiment, television script 190 includes programming instructions for picture 143 and television video 133, similar to those for picture 141 and television video 131.

In one embodiment, television 110 processes television script 190 to place picture 141 and picture 143 in an overlay manner. Television script 190 includes programming instructions to overlay picture 141 over picture 143 on display 113. In one embodiment, picture 141 overlays on top of picture 143. In one embodiment, picture 141 overlays partially on top of picture 143. In one embodiment, picture 141 overlays translucently on top of picture 143 where picture 143 is partially visible. In one embodiment picture 141 is larger than picture 143. In another embodiment, picture 143 is larger than picture 141.

In one embodiment, picture 141 overlaps with picture 143 on display 113 such that viewer 100 sees picture 141 and not picture 143 in the overlap area. In one embodiment viewer 100 sees picture 141 with a translucent view of picture 143 in the overlap area. In one embodiment, the overlap area includes the entire picture 141, entire picture 143, or part of either picture 141 or picture 143. In one embodiment, television 110 continues playing television video 131 and television video 133 while picture 141 and picture 143 are displayed simultaneously in an overlay manner on display 113. In one embodiment, picture 141 and picture 143 overlap and change position over time so that during some time period picture 141 is visible and during other time periods picture 143 is visible.

Television 110 obtains television script 190 over a data network 330 and stores the television script 190 in local storage 180. The local storage 180 is a computer readable medium that stores the programming instructions of the television script 190. In one embodiment, data network 330 includes the Internet. In one embodiment, data network 330 includes an Internet Service Provider (ISP) network. In one embodiment, data network 330 includes a Content Delivery Network (CDN). In one embodiment, data network 330 includes a private network operated by or for a business, such as a hotel, a multi-tenant complex, a gym, a rehabilitation center, or a casino. In one embodiment, data network 330 includes a home network. In one embodiment, data network 330 includes a broadband network. In one embodiment, data network 330 includes an Ethernet. In one embodiment, data network 330 includes a WiFi network. In one embodiment, data network 330 includes a wireless network such as a Wireless Local Area Network (WLAN), a Worldwide Interoperability for Microware Access (WiMax) network, or an UltraWideband (UWB) network. In one embodiment, data network 330 includes a cellular network, such as a 3G network. In one embodiment, data network 330 includes a digital television network such as a cable television network, a satellite television network, or an IPTV network like Verizon's FiOS or AT&T's U-Verse. In one embodiment, data network 330 includes a digital subscriber line (DSL) network or cable broadband network. In one embodiment, data network 330 includes fiber based subscriber broadband network.

In one embodiment, television 110 obtains television script 190 from a television service provider 174 and stored the script 190 in the local storage 180. In one embodiment, television service provider 174 includes a television programming network, a television syndicate, or a television station. In one embodiment, television service provider 174 includes a television programming guide network. In one embodiment, television service provider 174 includes a cable television network, or a satellite television network. In one embodiment, television service provider 174 includes an advertisement agency. In one embodiment, television service provider 174 includes a web portal of a sports television network. In one embodiment, television service provider 174 includes a CDN.

Figure 2:
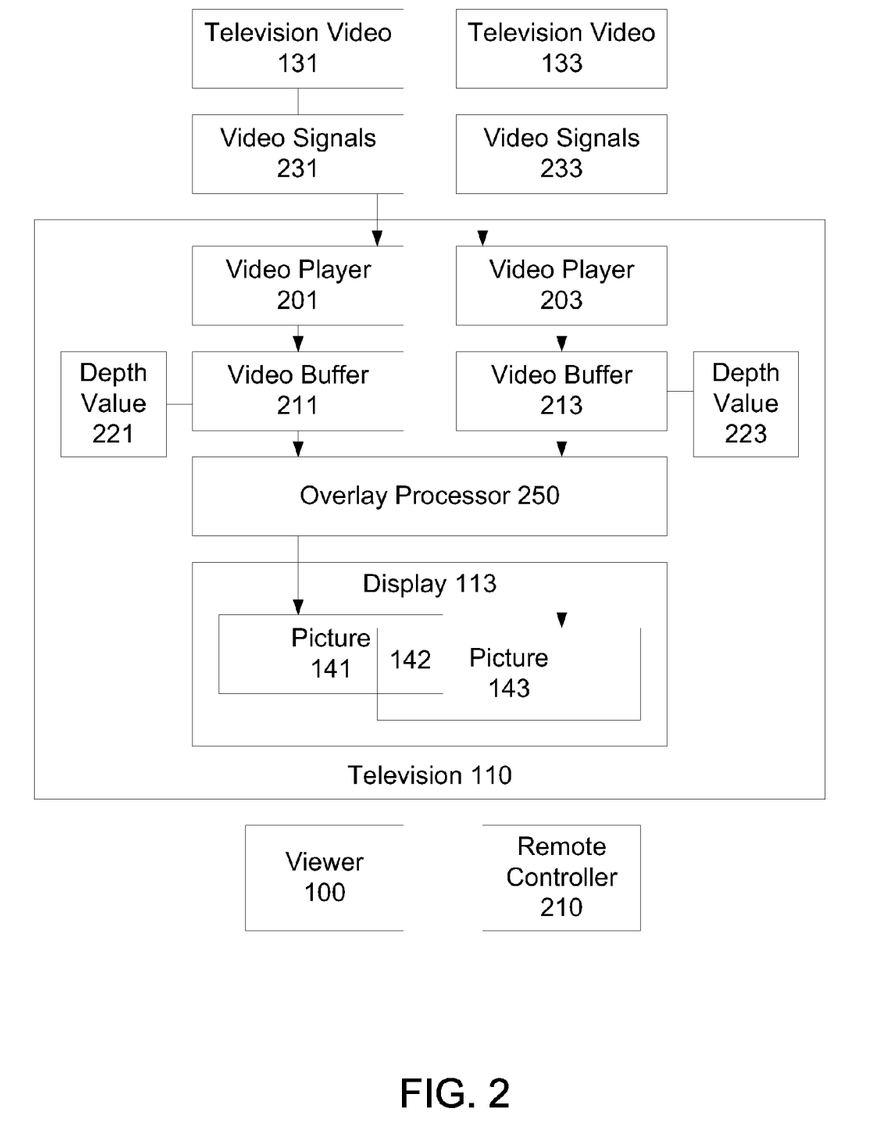
FIG. 2 illustrates a process for overlaying pictures.

FIG. 2 illustrates a process for overlaying pictures.

Television 110 includes a video player 201, and a video buffer 211. In one embodiment, television script 190 includes programming instructions for video player 201. Television script 190 instructs video player 210 to process television video 131. Video player 201 processes television video 131. Video player 201 receives a stream of video signals 231 of television video 131, processes the video signals 231 and places the picture output into video buffer 211.

In one embodiment, video player 201 includes a software media player such as Adobe Flash Player, Adobe Media Player, Microsoft Silverlight, or Windows Media Player. In one embodiment, video player 201 includes a standalone or embedded software application capable of playing back video signals 231. In one embodiment, video player 201 includes a special purpose DSP (digital signal processor) or microcontroller such as a Broadcom media processor, TI media processor or a Sigma Designs media processor. In one embodiment, video player 201 includes a general purpose central processing unit (CPU), such as Intel Pentium or Atom processor. In one embodiment, video player 201 includes integrated circuits (ICs) such as ARM9 or ARM11 cores. In one embodiment, video player 201 includes a video capable graphics processor. In one example, the graphics processor is an integrated graphics processor such as the Intel graphics processor, AMD graphics processor or NVIDIA graphics processor. In one example, the graphics processor is included in another processor.

In one embodiment, video buffer 211 includes system memory such as DRAM. In one embodiment, video buffer 211 includes video memory addressable by a graphics processor. In one embodiment, pictures 141 and 143 are stored in separate areas in video buffer 211.

Television 110 associates video buffer 211 with a depth value 221. Different video buffers are associated with different depth values. Depth value 221 represents a depth perspective for the viewer 100. In one embodiment, the larger the depth value 221, the further away picture 141 looks from the perspective of viewer 100.

In one embodiment, depth value 221 includes an integral or floating point number. In another embodiment, depth value 221 includes a tag such as "front", "middle", or "back". In another embodiment, depth value 221 is associated with the position of pictures in a data structure such as a stack. In yet another embodiment, depth value 221 is determined using a graphics programming API such as OpenGL or DirectX.

In one embodiment, television 110 includes an overlay processor 250. In one embodiment, overlay processor 250 includes a software library such as OpenGL or DirectX. In one embodiment, overlay processor 250 includes an integrated circuit such as a Broadcom media processor, TI media processor, or integrated or discrete graphics processors from Intel, ATI or NVidia. In one embodiment, overlay processor 250 includes graphics programming capabilities such as vector graphics, 2D graphics, 3D graphics.

In one embodiment, television script 190 includes programming instructions which are processed by the programming processor 119. The programming processor 119 then instructs the overlay processor 250 to render picture 141 using video buffer 211 and depth value 221.

Overlay processor 250 processes video buffer 211 by rendering the contents of video buffer 211 onto picture 141 on display 113. Overlay processor 250 obtains depth value 221 and video buffer 211 from television script 190 and takes into consideration of depth value 221 when rendering picture 141.

Television 110 includes a second video player 203, and a video buffer 213. Television script 190 includes programming instructions for video player 203 to process television video 133. Video player 203 processes television video 133. Video player 203 receives a stream of video signals 233 of television video 133, processes video signals 233 and places the picture output into video buffer 213. Video buffer 213 is associated with a depth value 223. Television script 190 includes programming instructions for overlay processor 250 to render picture 413 using video buffer 213 and depth value 223. Overlay processor 250 obtains depth value 223 and video buffer 213 from television script 190 and takes into consideration of depth value 223 when rendering video buffer 213 onto picture 143.

In one embodiment, depth value 223 is smaller than depth value 221, picture 143 overlaps with picture 141 in region 142. Picture 143 appears closer to viewer 100 than picture 141. In one embodiment, depth value 223 is "front" or "top", indicating picture 143 appears closer to viewer 100 than picture 141. When overlay processor 250 combines video buffers 211 and 213 onto pictures 141 and 143, overlay processor 250 renders video buffer 213 onto picture 143, including region 142. Overlay processor 250 renders video buffer 211 onto picture 141, excluding region 142. Viewer 100 sees television video 133 on region 142 and not television video 131 on region 142. Viewer 100 sees picture 143 overlays on to picture 141.

In one embodiment, television script 190 includes programming instructions for graphics or overlaying effects. In one embodiment, the graphics or overlaying effects includes shadow, translucence, refraction, or reflection. In one embodiment, the graphics or overlaying effects includes 2D or 3D operations such as rotation, scaling, translation, animation or spinning Overlay processor 250 obtains the graphics or overlaying effects from television script 190 and applies the graphics or overlaying effects onto picture 141 or region 142. In one embodiment, overlay processor 250 renders picture 143 with a 3D operation such as rotation, translation, magnification, shrinking, texturing, or any 3-dimension animation operation. Picture 143 overlays with picture 141 during the operation. In one embodiment, overlay processor 250 renders picture 143 with a 2D operation such as scaling, moving, blinking, flashing, rotation, spinning, or any 2-dimension animation operation. Picture 143 overlays with picture 141.

In one embodiment, television 110 includes a user interaction. In an embodiment, television script 190 includes programming instructions to allow viewer 100 to select picture 141 or picture 143. In one embodiment, viewer 100 uses a remote controller 210 to select. In one embodiment, picture 143 overlays over picture 141. Viewer 100 selects picture 143 when the remote controller 210 points to region 142. In one embodiment, picture 143 has a translucent effect, viewer 100 selects picture 141 when remote controller 210 points to region 142. In one embodiment, when picture 143 overlays over picture 141, picture 141 becomes not selectable when remote controller 210 points to any place in picture 141. In one embodiment, picture 143 partially overlays over picture 141, and when remote controller 210 selects picture 141, picture 141 now overlays over picture 143.

Figure 3:
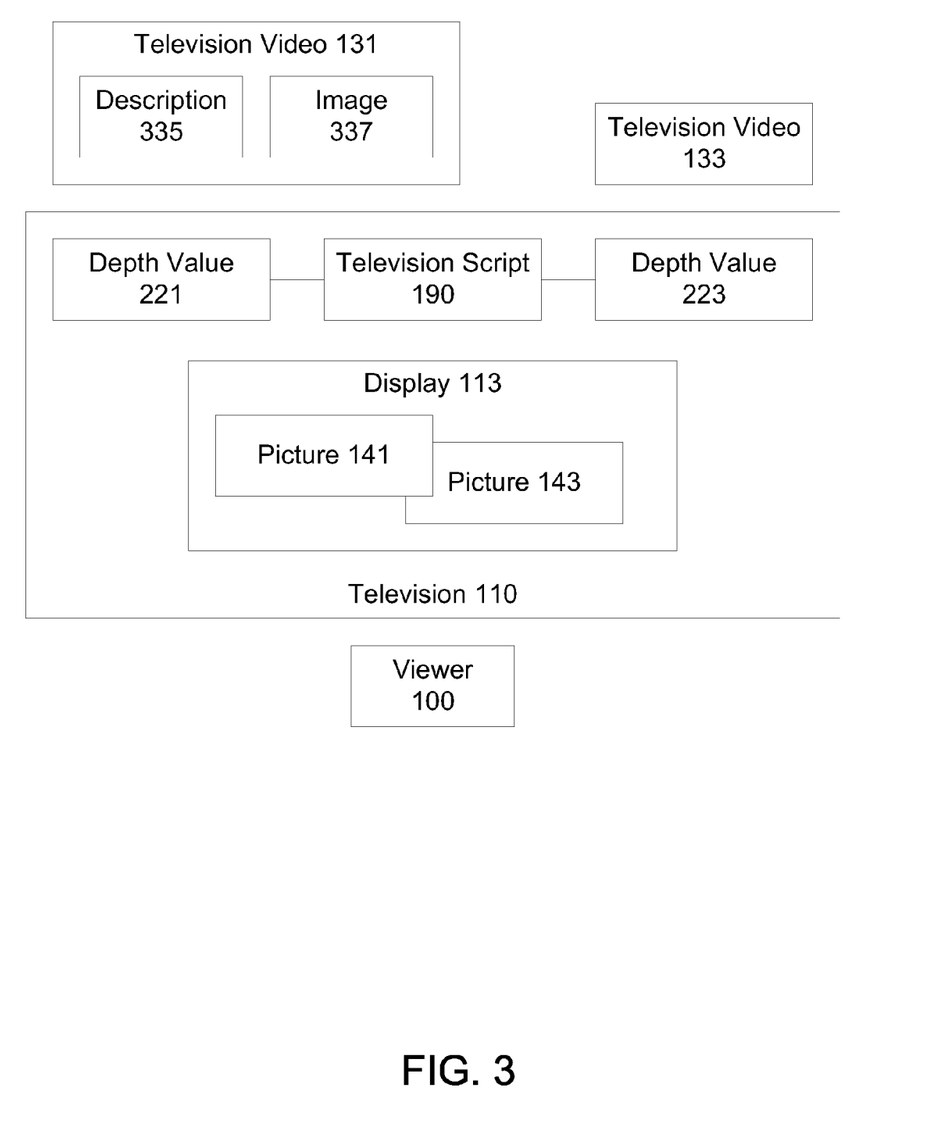
FIG. 3 illustrates a television script automatically changing overlaying effects.

FIG. 3 illustrates television script 190 automatically changing overlaying effects.

In one embodiment, television script 190 specifies depth values 221 and 223.

In one embodiment, television video 131 includes a description 335, wherein television script 190 performs a video search based on description 335. In one embodiment, the search result includes television video 133. Television script 190 includes depth value 223 and display region for display of the search results. In one embodiment, television 110 obtains description 335 when the viewer 100 selects picture 141 with remote controller 210. In another embodiment, television 110 obtains description 335 when a timer expires. In yet another embodiment, television 110 obtains description 335 in response to a network event. In one example, television service provider 174 sends a message to television 110 to trigger television 110 to obtain description 335.

In one embodiment, description 335 is encoded in Extensible Markup Language (XML). In one embodiment, description 335 is encoded in a web scripting language such as Javascript or HTML. In one embodiment, description 335 is stored in television 110. In another embodiment, description 335 is retrieved over data network 330.

In one embodiment, description 335 includes information about television video 131, such as the name of the program, the cast, a summary of the plot, or user reviews. In one embodiment, description 335 includes a time stamp, such as the current time of day. In one embodiment, description 335 includes demographic information of viewer 100. In one embodiment, description 335 includes information about services subscribed to by viewer 100.

In one embodiment, television video 131 includes an image 337 of an actor. In one example, television video 131 is a television show and image 337 is an actor of the television show. Television script 190 includes programming instructions to determine a person based on the facial characteristics the image 337 (such as search in the Internet), as well as programming instructions to search for videos related to the person. In one embodiment, description 335 describes the image 337. In one embodiment, image 337 is a snapshot of television video 131. In another embodiment, image 337 is obtained separately through a network based on description 335. In another embodiment, image 337 is sent together with television video 131, for example, as part of Media RSS or SMIL. In one embodiment, image 337 is displayed on picture 141. In another embodiment, image 337 is not displayed on picture 141.

In one embodiment, image 337 includes an object such as a car. Television script 190 includes programming instructions to determine characteristics of a car, and programming instructions to determine the make and model of a car (such as search in the Internet), as well as programming instructions to search videos related to the car. In a similar embodiment, the object is merchandise such as a cell phone, a purse, a pair of boots, a diamond ring, or a dress. Television script 190 includes programming instructions to determine characteristics of the merchandise, and programming instructions to determine a merchant, as well as programming instructions to search videos related to the merchandise or merchant.

Figure 4:
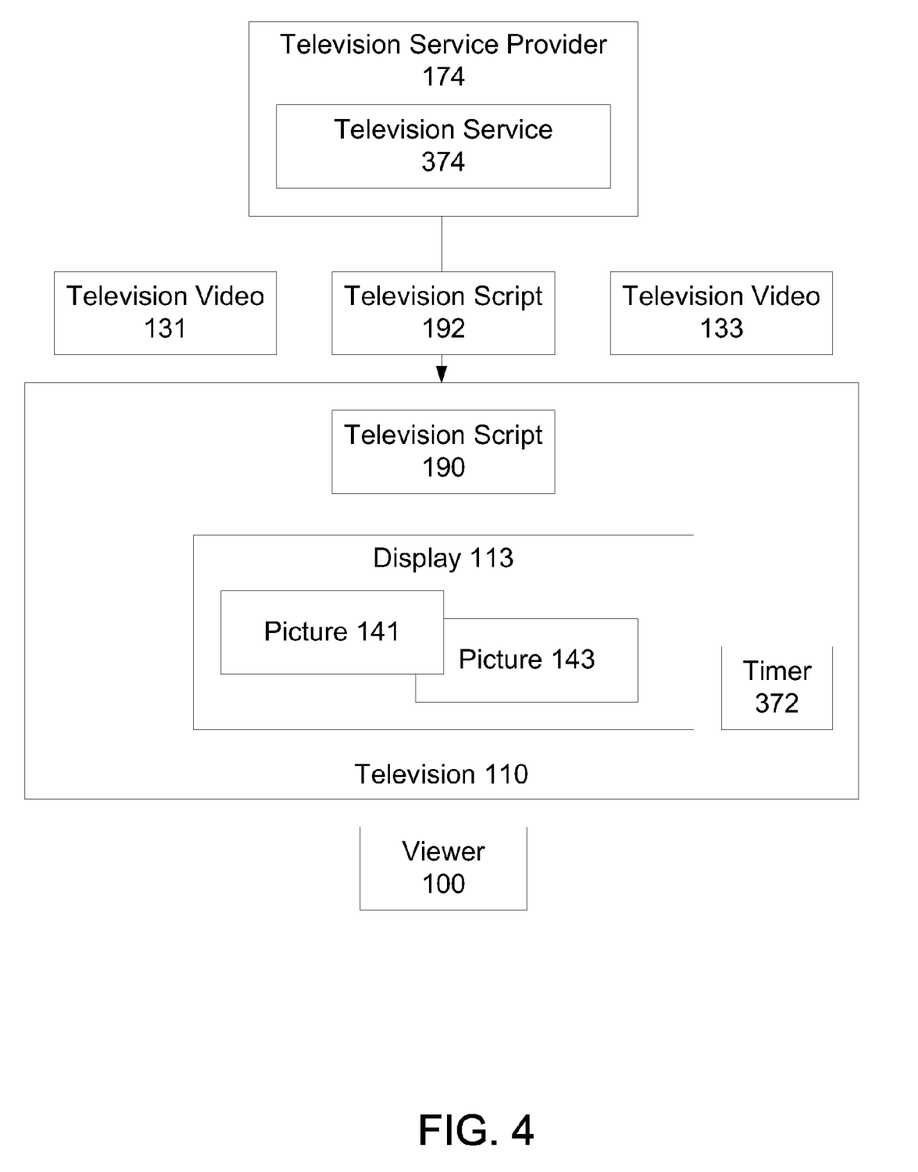
FIG. 4 illustrates a process of changing the overlay by a second television script.

FIG. 4 illustrates a process of changing the overlay by a second television script.

Television 110 may determine to obtain a second television script 192 that contains different instructions for processing the overlay of pictures 141 and 143. The second script may contain different depth values and/or placements for the pictures 141 and 143. There are different reasons to obtain second television script 192. For example, television 110 decides to display a logo for television service provider 174; to show an advertisement; to show an advertisement tailored for viewer 100; to show a pop-up animation; to show a highlight picture or video of a sport game; to display an actor profile; to display news, sports or stock updates; to alert viewer 100 of an event such as important news, an upcoming television show, or the next video; or to alert viewer 100 of an emergency.

In one embodiment, television script 190 includes instructions to obtain second television script 192.

In one embodiment, television script 190 determines television video 131 requires a second television script 192, and instructs television 110 to obtain television script 192. In one example, television video 131 is a sport television show, and television video 133 includes a replay of the last touchdown. Television script 190 instructs television 110 to obtain television script 192 which has the overlay instructions to process television video 133 and television video 131. In one embodiment, television video 131 is a movie, and television video 133 includes a chapter selection, wherein viewer 100 can select a chapter. Television script 190 instructs television 110 to obtain television script 192 which has instructions to play television video 133 corresponding to the selected chapter, to interact with viewer 100, and to overlay picture 143 over picture 141.

In one embodiment, television script 192 replaces television script 190. Television 110 uses television script 192 to process pictures 141 and 143. In one embodiment, after television 110 finishes processing television script 192, television 110 resumes processing television script 190. In one embodiment, video player 201 continues processing television video 131 while television 110 switches from television script 190 to television script 192. Viewer 100 does not see any interruption of television video 131 played on picture 141. In one embodiment, video player 203 continues processing television video 133 while television 110 switches from television script 190 to television script 192. Viewer 100 does not see any interruption of television video 133 played on picture 143.

In one embodiment, television 110 includes a timer 372. Television 110 determines timer 372 expires, and obtains television script 192. In one embodiment, pictures 141 and 143 are not interrupted when television 110 replaces television script 190 by television script 192. In one embodiment, television 110 subscribes to a television service 374 and automatically obtains television script 192 from television service provider 174.

In one embodiment, viewer 100 instructs television 110 to obtain television script 192. In one embodiment, television 110 obtains television script 192 based on video player 201. In one embodiment, television video 131 is television show of a football game. Video player 201 determines television video 131 is at half time of the football game. Video player 201 informs television 110 to obtain television script 192 with instructions to overlay television video 133 such as commentator interviews over television video 131.

In one embodiment, television script 190 includes one or more instructions to place picture 141 onto a new position on display 113. In one embodiment, television script 190 includes instructions to specify a path from the current position to the new position on display 113. In one embodiment, the path is a 3-dimensional path wherein depth value 221 changes while picture 141 is moved from the current position to the new position. In one embodiment, television script 190 includes instructions to specify an operation of picture 141. In one embodiment, the operation includes scaling the size of picture 141. In one embodiment, the operation includes rotating picture 141. In one embodiment, the rotation is based on 3-dimensional coordinates. In one embodiment, television script 190 includes instructions to repeat the operation of picture 141.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but no limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for displaying videos on a television, comprising:
   (a) receiving a plurality of video signals directly from a plurality of video sources by the television;
   (b) receiving a first software script by the television over a data network, the first software script comprising first web programming instructions and second web programming instructions;
   (c) in executing the first web programming instructions by the television, placing a first picture from a first video signal of the plurality of video signals in a first position at a first depth value on a display coupled to the television;
   (d) in executing the second web programming instructions by the television, placing a second picture from a second video signal of the plurality of video signals in a second position at a second depth value on the display, and displaying the second picture overlaying on top of the first picture;
   (e) receiving a second software script by the television over the data network, the second software script comprising third web programming instructions; and
   (f) in executing the third web programming instructions by the television, moving the first picture to a new position on the display using animation as specified by the third web programming instructions, wherein the first depth value of the first picture changes while the first picture is being moved, wherein at the new position, the first picture is displayed overlaying on top of the second picture based on the changed first depth value.

2. The method of claim 1, wherein the third web programming instructions further comprises a path from the first position to the new position for the first picture, wherein in executing the third web programming instructions, the first picture is moved to the new position along the path using the animation.

3. The method of claim 1, wherein the first software script further comprises web programming instructions to obtain the second software script.

4. The method of claim 1, wherein the first software script determines that the first video signal requires the second software script, and the first software script instructs the television to obtain the second software script.

5. The method of claim 1, wherein the television receives instructions from a viewer to obtain the second software script.

6. The method of claim 1, wherein the second software script replaces the first software script.

7. The method of claim 1, wherein after executing the third web programming instructions in the second software script, the television resumes the execution of the first and second web programming instructions in the first software script.

8. The method of claim 1, wherein the first video signal comprises a description, wherein the television performs a video search on the plurality of video signals based on the description, wherein a result of the video search comprises the second video signal.

9. The method of claim 8, wherein the first video signal further comprises an image, wherein the description is related to the image.

10. The method of claim 1, wherein the receiving (b) comprises:
    (b1) receiving the first software script by the television from a television service provider.

11. The method of claim 1, wherein the first, the second, and the third web programming instructions each comprise Javascript.

12. The method of claim 1, wherein the moving (f) comprises:
    (f1) moving the first picture to the new position on the display using a 3-dimensional animation as specified by the third web programming instructions.

13. The method of claim 12, wherein the 3-dimensional animation comprises one or more of the following: rotation; scaling; translation; and spinning.

14. The method of claim 1, wherein the first picture comprises a size, wherein the moving (f) further comprises:
    (f1) changing the size of the first picture as the first picture is moving to the new position on the display using the animation as specified by the third web programming instructions.

15. The method of claim 1, wherein the placing and displaying (d) comprises:
    (d1) displaying the second picture as overlaying translucently on top of the first picture, wherein the first picture is at least partially visible through the second picture in an overlaying area.

16. A television, comprising:
    a plurality of interfaces for receiving a plurality of video signals directly from a plurality of video sources;
    a first video player for processing a first video signal of the plurality of video signals;
    a first video buffer for storing a first picture from the processed first video signal, the first video buffer being associated with a first depth value;
    a second video player for processing a second video signal of the plurality of video signals;
    a second video buffer for storing a second picture from the processed second video signal, the second video buffer being associated with a second depth value;
    a local storage for storing a first software script received by the television over a data network, the first software script comprising first web programming instructions and second web programming instructions; and
    an overlay processor for executing the first web programming instructions and the second web programming instructions, wherein in executing the first web programming instructions, the overlay processor places the first picture in a first position at the first depth value on a display coupled to the television, wherein in executing the second web programming instructions, the overlay processor places the second picture at the second depth value on the display and displays the second picture overlaying on top of the first picture, wherein the local storage further stores a second software script received by the television over the data network, the second software script comprising third web programming instructions, wherein the overlay processor further executes the third web programming instructions wherein in executing the third web programming instructions, the overlay processor moves the first picture to a new position on the display using animation as specified by the third web programming instructions, wherein the first depth value of the first picture changes while the first picture is being moved, wherein at the new position, the first picture is displayed overlaying on top of the second picture based on the changed first depth value.

17. The television of claim 16, wherein the first video player and the second video player each comprises a video capable graphics processor.

18. The television of claim 17, wherein the first video buffer and the second video buffer each comprises video memory addressable by the corresponding video capable graphics processor.

19. The television of claim 16, wherein the first video signal comprises a description, wherein the television performs a video search on the plurality of video signals based on the description, wherein a result of the video search comprises the second video signal.

20. The television of claim 16, wherein the first software script is received by the television from a television service provider.

21. The television of claim 16, wherein the first, the second, and the third web programming instructions each comprise Javascript.

22. The television of claim 16, wherein in executing the third web programming instructions, the overlay processor further moves the first picture to the new position on the display using a 3-dimensional animation as specified by the third web programming instructions.

23. The television of claim 22, wherein the 3-dimensional animation comprises one or more of the following: rotation; scaling; translation; and spinning.

24. The television of claim 16, wherein the first picture comprises a size, wherein in executing the third web programming instructions, the overlay processor further changes the size of the first picture as the first picture is moving to the new position on the display using the animation as specified by the third web programming instructions.

25. The television of claim 16, wherein the placing and displaying of the first picture and second picture comprises:
displaying the second picture as overlaying translucently on top of the first picture, wherein the first picture is at least partially visible through the second picture in an overlaying area.

26. A non-transitory computer readable medium having computer readable code for processing video signals received by a television, the computer readable code configured to:
receive a plurality of video signals directly from a plurality of video sources by the television;

receive a first software script by the television over a data network, the first software script comprising first web programming instructions and second web programming instructions;

in executing the first web programming instructions by the television, place a first picture from a first video signal of the plurality of video signals in a first position at a first depth value on a display coupled to the television;

in executing the second web programming instructions by the television, place a second picture from a second video signal of the plurality of video signals in a second position at a second depth value on the display, and display the second picture overlaying on top of the first picture;

receive a second software script by the television over the data network, the second software script comprising third web programming instructions; and in executing the third web programming instructions by the television, move the first picture to a new position on the display using animation as specified by the third web programming instructions, wherein the first depth value of the first picture changes while the first picture is being moved, wherein at the new position, the first picture is displayed overlaying on top of the second picture based on the changed first depth value.

27. The medium of claim 26, wherein the third web programming instructions further comprises a path from the first position to the new position for the first picture, wherein in executing the third web programming instructions, the first picture is moved to the new position along the path using the animation.

28. The medium of claim 26, wherein the receive is further configured to:
receive the first software script from a television service provider.

29. The medium of claim 26, wherein the first, the second, and the third web programming instructions each comprise Javascript.

30. The medium of claim 26, wherein in executing the third web programming instructions, the first picture moves to the new position on the display using a 3-dimensional animation as specified by the third web programming instructions.

31. The medium of claim 30, wherein the 3-dimensional animation comprises one or more of the following: rotation; scaling; translation; and spinning.

32. The medium of claim 26, wherein the first picture comprises a size, in executing the third web programming instructions, the size of the first picture changes as the first picture is moving to the new position on the display using the animation as specified by the third web programming instructions.

33. A system, comprising:
a processor; and
a non-transitory computer readable medium having computer readable code for processing video signals, wherein when executed by the processor causes the system to:
receive a plurality of video signals directly from a plurality of video sources by a television;
receive a first software script by the television over a data network, the first software script comprising first web programming instructions and second web programming instructions;
in executing the first web programming instructions by the television, place a first picture from a first video signal of the plurality of video signals in a first position at a first depth value on a display coupled to the television;

in executing the second web programming instructions by the television, place a second picture from a second video signal of the plurality of video signals in a second position at a second depth value on the display, and display the second picture overlaying on top of the first picture;

receive a second software script by the television over the data network, the second software script comprising third web programming instructions; and in executing the third web programming instructions by the television, move the first picture to a new position on the display using animation as specified by the third web programming instructions, wherein the first depth value of the first picture changes while the first picture is being moved, wherein at the new position, the first picture is displayed overlaying on top of the second picture based on the changed first depth value.

34. The system of claim 33, wherein the system receives the first software script from a television service provider.

35. The system of claim 33, wherein the first, the second, and the third web programming instructions each comprise Javascript.

36. The system of claim 33, wherein in executing the third web programming instructions, the first picture moves to the new position on the display using a 3-dimensional animation as specified by the third web programming instructions.

37. The system of claim 36, wherein the 3-dimensional animation comprises one or more of the following: rotation; scaling; translation; and spinning.

38. The system of claim 33, wherein the first picture comprises a size, in executing the third web programming instructions, the size of the first picture changes as the first picture is moving to the new position on the display using the animation as specified by the third web programming instructions.

* * * * *